(12) United States Patent
Etter et al.

(10) Patent No.: US 10,022,012 B2
(45) Date of Patent: Jul. 17, 2018

(54) FAST HEAT-UP OF A THERMAL CONDITIONING DEVICE E.G. FOR COFFEE MACHINE

(75) Inventors: Stefan Etter, Kehrsatz (CH); Peter Mori, Walperswil (CH)

(73) Assignee: Nestec S.A., Vevey (CH)

(*) Notice: Subject to any disclaimer, the term of this patent is extended or adjusted under 35 U.S.C. 154(b) by 971 days.

(21) Appl. No.: 13/704,006

(22) PCT Filed: Jun. 14, 2011

(86) PCT No.: PCT/EP2011/059771
§ 371 (c)(1),
(2), (4) Date: Dec. 13, 2012

(87) PCT Pub. No.: WO2011/157675
PCT Pub. Date: Dec. 22, 2011

(65) Prior Publication Data
US 2014/0322401 A1 Oct. 30, 2014

(30) Foreign Application Priority Data
Jun. 17, 2010 (EP) .................................... 10166366

(51) Int. Cl.
*A47J 31/56* (2006.01)
*A47J 31/54* (2006.01)
(52) U.S. Cl.
CPC ............. *A47J 31/56* (2013.01); *A47J 31/545* (2013.01)
(58) Field of Classification Search
CPC ...... A47J 31/56; A47J 31/545; A47J 27/2105; A47J 31/407; A47J 31/441; A47J 31/542;
(Continued)

(56) References Cited

U.S. PATENT DOCUMENTS

| 5,408,917 A | 4/1995 | Lussi |
| 5,639,023 A | 6/1997 | Hild et al. |

(Continued)

FOREIGN PATENT DOCUMENTS

| CN | 1704487 A | 12/2005 |
| CN | 101737955 | 6/2010 |

(Continued)

OTHER PUBLICATIONS

Office Action mailed in CN Application 201180029715.4 dated Nov. 3, 2014, 22 pages.

(Continued)

*Primary Examiner* — Steven Leff
(74) *Attorney, Agent, or Firm* — K&L Gates LLP

(57) ABSTRACT

The invention concerns a unit (1000) for controlling transmission of power to a thermal conditioning device (100) e.g. for coffee machine, comprising a controller (2) with a start-up profile for starting-up said device (100) from a temperature of inactivity (TI) to an operative temperature for bringing to a target temperature (TT) a fluid circulating through said device (100) at start-up end, said controller (2) being arranged to allow circulation of fluid through said device (100) at start-up end and to compare the determined temperature (SOT) of fluid circulated at start-up end to the target temperature (TT) and derive a temperature difference therefrom. It is characterized in that the start-up profile has at least one parameter and in that said controller (2) has a self-learning mode for adjusting said parameter as a function of said temperature difference and to store the adjusted parameter for a subsequent starting-up of said device (100). The invention concerns in particular a method for optimized heating up of a coffee machine (104).

6 Claims, 4 Drawing Sheets

(58) Field of Classification Search
CPC ........ A47J 31/58; F24H 9/2028; F24H 1/101; F24H 1/105; F24H 1/142; H01H 37/25; H01R 12/718; H01R 12/728
USPC .............................................. 426/231; 99/281
See application file for complete search history.

(56) References Cited

U.S. PATENT DOCUMENTS

| | | | |
|---|---|---|---|
| 5,862,738 | A | 1/1999 | Warne |
| 7,263,283 | B2 | 8/2007 | Knepler |
| 7,281,467 | B2 | 10/2007 | Cai |
| 7,907,835 | B2 | 3/2011 | Boussemart et al. |
| 2004/0159240 | A1 | 8/2004 | Lyall |
| 2006/0096465 | A1 | 5/2006 | Hu et al. |
| 2008/0273868 | A1* | 11/2008 | Boussemart .......... F24H 9/2028 392/479 |

FOREIGN PATENT DOCUMENTS

| | | | |
|---|---|---|---|
| DE | 10138455 | 2/2003 | |
| EP | 0935938 | 8/1999 | |
| EP | 1634520 | 3/2006 | |
| JP | S56168228 A | 12/1981 | |
| JP | 1085128 | 4/1998 | |
| WO | 2005058747 | 6/2005 | |
| WO | WO 2008155538 A2 * | 12/2008 | .......... A47J 27/2105 |
| WO | 2009024425 | 2/2009 | |
| WO | 2009043865 | 4/2009 | |
| WO | 2009081159 | 7/2009 | |

OTHER PUBLICATIONS

Bezzera BZ07 Instruction Manual. p. 1-15, 47-56. 25 pages.
Smarter Logic Model ETR-9090 microprocessor Based Smarter Logic Auto Tune PID Controller. Manual No. 14A. 22 22 pages.
WATLOW Practical PID Guide for Process Control. Aug. 2005. 14 pages.
Notice of Opposition dated Feb. 9, 2015 in EP 11725434.2. 1 page.
European letter of Opposition—Appl. No. 11725434.2—dated Mar. 8, 2017—3 pages.
Google Search—Watlow PID Practical Guide—1 page.
Google Search—bezzera bz07 user manual—8Z07 DE BZ07 PM—1st-line Equipment—1 page.
Google Search—ETR 9090 instruction manual—Delta T—1 page.
Internet Archive Wayback Machine ETR 9090 Delta T—1 page.
Chinese Office Action for corresponding application No. 201610416465.4, dated Feb. 26, 2018, 10 pages.

* cited by examiner

FAST HEAT-UP OF A THERMAL CONDITIONING DEVICE E.G. FOR COFFEE MACHINE

CROSS REFERENCE TO RELATED APPLICATIONS

The present application is a National Stage of International Application No. PCT/EP2011/059771, filed on Jun. 14, 2011, which claims priority to European Patent Application No. 10166366.4, filed on Jun. 17, 2010, the entire contents of which are being incorporated herein by reference.

FIELD OF THE INVENTION

The invention concerns the start-up of a thermal conditioning device, in particular a device with a thermal accumulator such as a thermoblock, for heating or cooling a fluid circulating therethrough, e.g. a heater for a beverage preparation machine. In particular the present invention concerns a method for optimized heating up of a coffee machine in-line heater to an operating temperature from a rest temperature with best possible heat up time and consideration of different system constellations.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e. g. plastic, aluminum, recyclable and/or bio-degradable packaging and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water are also well known and are for example disclosed in CH 593 044, DE 103 22 034, DE 197 32 414, DE 197 37 694, EP 0 485 211, EP 1 380 243, FR 2 799 630, U.S. Pat. No. 4,242,568, U.S. Pat. No. 4,595,131, U.S. Pat. No. 5,019,690, U.S. Pat. No. 5,392,694, U.S. Pat. No. 5,943,472, U.S. Pat. No. 6,393,967, U.S. Pat. No. 6,889,598, U.S. Pat. No. 7,286,752, WO 01/54551 and WO 2004/006742.

More particularly, CH 593 044 and U.S. Pat. No. 4,242,568 disclose a coffee machine with an inline thermoblock heater having a metal mass with a resistive heating cable cast in the mass and with a duct for the circulation of water to be heated.

Thermoblocks are in-line heaters through which a liquid is circulated for heating. They generally comprise a heating chamber, such as one or more ducts, in particular made of steel, extending through a mass of metal, in particular a massive mass of metal, in particular made of aluminium, iron and/or another metal or an alloy, that has a high thermal capacity for accumulating heat energy and a high thermal conductivity for the transfer the required amount of the accumulated heat to liquid circulating therethrough whenever needed. Instead of a distinct duct, the thermoblock's duct may by a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct or ducts may have a helicoidal or another arrangement along the thermoblock to maximise its/their length and heat transfer through the block.

A drawback of thermoblocks lies in the difficulty to accurately control the temperature and optimise the required heating energy for bringing the liquid to be heated to the desired temperature. Indeed, the thermal inertia of the metal mass, the localised and uneven resistive heating of the mass, the dynamic heat diffusion from the heating in the mass to different parts of the mass affecting the measured temperature of the mass at predetermined locations make an accurate control of the thermoblocks to heat the circulating liquid to a desired predetermined temperature quite difficult and moreover requires quite long pre-heating periods, typically of 1 to 2 min in the case of espresso machines. Furthermore, it is difficult to predict various parameters involving the subsequent use of the thermoblock produced in series, e.g. the temperature of the environment, the net voltage of the mains, the actual value of the heating resistor of the thermoblock, thermal insulation of the thermoblock, the initial temperature of the liquid circulated through the thermoblock. Consequently, thermoblocks are usually associated with dynamic loop-controlled powering circuit tailoring the powering of the thermoblock with continuous measuring of the temperature by means of at least one temperature sensor. However, due to the complex thermal flow of such a system, the stabilisation of the thermoblock at a certain temperature level adjusted to the real heating needs of the flow of liquid to be circulated is lengthy and still difficult to achieve.

An approach to improve the heating accuracy is taught in EP 1 380 243. This patent discloses a heating device intended in particular to equip coffee machines. This heating device comprises a metal tube through which the liquid that is to be heated can flow from an inlet duct to an outlet duct. The exterior surface of the tube is covered over several sections of its length with a plurality of sets of electric resistive elements in series. A cylindrical insert extends inside the tube to form, with the interior wall of the tube, a helical duct through which the liquid can circulate and which thus encourages turbulent flow and rapid transfer of energy from the tube to the liquid. A flowmeter is also positioned upstream of the inlet duct. The device further comprises a plurality of temperature sensors distributed along the length of the tube at the entry to and exit from each set of resistive elements. The principle governing the distribution of heating energy to the liquid in this instance is based on modulating the electrical power produced by the resistive elements which can be switched independently of one another or in series according to the water temperature at the inlet to the duct. Although this device gives results which are satisfactory in terms of the speed of heating, this device is relatively bulky in that the volume of water to be heated determines the height of the tube, and is expensive in that it requires resistive elements to be printed in the form of thick films on the surface of the tube, using what is currently known as "thick film" technology.

Furthermore, the accuracy with which the liquid temperature is regulated is limited by the fact that the liquid does not come into direct contact with the sensors which are positioned outside the tube. The rate of response to temperature differences, due to the inertia of the liquid that is to be heated, is also slower, and this detracts from the accuracy with which the temperature can be regulated. It should also be noted that the proximity of the temperature sensors to the sets of resistive elements runs the risk of influencing the measurement in an uncontrollable manner because of the thermal conduction that occurs through the wall of the tube.

In addition, more or less complex attempts to improve the thermal control of heaters for batch or in-line low inertia heaters have been proposed in DE 197 11 291, EP 1 634 520, U.S. Pat. No. 4,700,052 and U.S. Pat. No. 6,246,831.

Other methods for controlling heaters are known from different documents like WO2008/023132, which describes an evaluation of the system heat up speed and calculation of needed energy, but which is mostly based to relay technology and different water content of the heater, like a water cooker.

EP 0 935 938 B1 shows how an automatic start of a pump after heat up target is reached, and concerns in general measuring of temperature with a resistance based temperature sensor to monitor temperature of a heater. Different heat up cut-off temperatures are contemplated for the heater depending on the temperature of the heater at powering thereof.

There is still a need to provide a simple and reliable power control for thermoblocks for a fast heating thereof for accurately heating a liquid circulated there through during normal use and under various conditions of use.

SUMMARY OF THE INVENTION

A preferred object of the invention is to provide an in-line self-learning heating device with a heat accumulator, such as a thermoblock, that has a minimum start-up duration to reach a sufficient temperature for initiating a first beverage preparation.

In order to provide such a self-learning heating device the invention endeavours to develop a self-learning control system easy to integrate in this heating device.

Thus the present invention concerns a self-learning heating device with a thermoblock and a self-learning controller, particularly for a beverage preparation machine, more particularly for a coffee machine. Said beverage preparation machine or coffee machine includes at least one such self-learning heating device.

A preferred object of the invention is to provide a method for optimized heating up of an electrical device, particularly of such a beverage preparation machine, particularly of a coffee machine, to an operating temperature from any starting temperature with best possible heat up time.

The pre-heating process is configured with the idea that a given beverage preparation machine will generally start-up under the same or similar conditions every time it is started after an extend period of non-use, e.g. from a "cold" state.

Once the machine is installed in a location, such as kitchen, the external conditions, such as the surrounding temperature, e.g. the room temperature and net voltage will normally not vary significantly or at least not radically over time. Moreover, the internal characteristics of a given heating device, in particular the electric heating element or resistor of the thermoblock will not significantly change over time either.

The complete heating process is so configured that a given beverage preparation machine can start-up under any conditions, or from a cold state, or after other beverage preparations. The speed of the heating process according the invention has to be optimized independently of the location of the beverage preparation machine, or of the climatic conditions, or of the features of the local electric current, or of other intern or extern parameters.

With each start-up of the machine, a temperature sensor system will monitor the temperature of the circulated water supplied by the heater and adjust, if necessary, the preheating duration for the next start-up procedure, and the heating process in order to reach as close as possible a given target temperature, e.g. for coffee extraction, such as in the range of 85 to 95° C. as appropriate.

It follows that the machine has a self-learning pre-heating or/and heating process that improves over time by learning in a given environment. In practice, one or two start-up procedures may be sufficient to fine-tune the machine to the specific internal and external conditions under which it is operating.

If the machine is moved to a different location, e.g. in an environment that is hotter or cooler, the self-learning pre-heating process will have to re-adapt to the new environment. Equally, if the machine is repaired in a manner that affect the heating characteristics, e.g. a resistive heater is replaced by a new one that does not have exactly the same heating characteristics, the machine will need to undergo a new self-learning process.

Each time the conditions of start-up are significantly changed, the machine will have to readjust and the temperature of the first beverage will be slightly substandard.

Consequently, the heater control for preheating will be adjusted to allow beverage preparation as soon as the heater is in a state, derived experimentally from past start-ups with the same heater, to heat to the desired temperature the required amount of circulated liquid.

The present invention thus departs from the prior art approach of providing an average setting for the preheating supposed to be more or less adapted to any contemplated operating conditions, and then adjust the preheating in the course of each preheating cycle to take into account the real operating conditions. The present invention provides a preheating resetting system to align the preheating setting to the actual operating conditions which are expected to be more or less constant over time so that no or minimal fine-tuning is needed during each preheating cycle. In other words, instead of readjusting the preheating during the preheating in a time and/or energy consuming process, the system of the invention is adapted to anticipate the preheating requirements derived from the experienced conditions of a particular machine with its particular characteristics and operating in a particular environment. The machine is arranged to adapt itself to its operating conditions and optimise the start-up procedure accordingly.

For an espresso machine, e.g. typically with a heater of about 1200 W for heating up 25 to 130 ml in about 10 to 40 sec., it has been observed that by relying on past experimental pre-heating experience instead of a preheating based on a loop controlled preheating process, temperature sensing issues in the heater relating to a temperature gradient throughout the heater may be avoided and the pre-heating duration may be reduced by 30 to 70%, e.g. from 90 sec to 30 sec or less.

Consequently, the heater control for heating can be adjusted generally to allow beverage preparation as soon as physically possible.

Therefore, the present invention relates to a unit for controlling transmission of power to a thermal conditioning device, such a heater or cooler. This unit comprises:
- a controller with a start-up profile for starting-up such a thermal conditioning device from a temperature of inactivity to an operative temperature for bringing to a target temperature a fluid circulating through said thermal conditioning device at start-up end; and
- a temperature sensor connected to said controller for determining a temperature of said fluid upon circulation through said thermal conditioning device.

The controller is arranged to allow circulation of fluid through the thermal conditioning device at start-up end and to compare the determined temperature of fluid circulated at start-up end to the target temperature and derive a temperature difference therefrom.

In accordance with the invention, the start-up profile has at least one parameter and the controller has a self-learning mode for adjusting such parameter as a function of said temperature difference and to store the adjusted parameter or parameters for a subsequent starting-up of said thermal device.

At least one parameter can be a duration of the power start-up profile. At least one parameter may be a power intensity of the power start-up profile. In any case, the power intensity may be variable or constant over time during start-up. For example, at least one parameter is a target temperature of said thermal conditioning device.

The thermal conditioning device typically comprises a thermal accumulator or a thermoblock.

In an embodiment, said controller includes at least a clock to launch measures of temperature at periodic time intervals, and includes data storage means for storing a target temperature and for storing temperatures measured at said periodic time intervals, and said controller further including calculation means for calculating a switch-off temperature, said calculation means being arranged for:
a) calculating temperature gradients between different stored temperatures values;
b) calculating an average gradient of said temperature gradients; and
c) calculating a switch-off temperature by subtracting an overshoot temperature to said target temperature, said overshoot temperature corresponding to said average gradient by means of a calculation from said last calculated average gradient, or by means of a correlation with store conversion tables between said average gradients and overshoot temperatures, the data storage means being further arranged for storing:
A) said overshoot temperature;
B) said calculated temperature gradients;
C) said calculated average gradient; and
D) said calculated switch-off temperature, the controller device being arranged for switching off the thermal conditioning device when the last measured temperature overshoots said calculated switch-off temperature.

The invention still concerns a heating device for, and arranged to be incorporated into, a beverage preparation machine or a coffee machine, including at least such one unit. Typically, the heating device has a powering in the range of 0.5 to 3 kW and an ability to heat up a circulating fluid for preparing one or two beverage cups, e.g. by heating 25 to 300 ml water from room temperature to around 80 to 90° C., in 5 to 50 sec.

The invention also concerns a beverage preparation machine, such as a coffee machine, including at least such a self-learning heating device.

A further aspect of the invention concerns a method for optimized heating up of a beverage preparation machine, such as a coffee machine, to an operating temperature from any starting temperature with best possible heat up time and consideration of different system constellations, like namely:
- net voltage tolerances, for example from nominal voltage, e.g. 110 or 220 V, up to +/−20%;
- heat resistance tolerances, for example +/−10%,
- different environmental temperatures, for example in the range of 5° C. to 40° C.;
- different thermal isolation of heater, which entails different temperature losses, for example +/−5%;
- different heater starting temperatures, for example 5° C. to 90° C.;
- heating device either full of water or empty.

Thus the invention concerns a method for optimized heating up of a beverage preparation machine, such as a coffee machine, to an operating temperature from any starting temperature with best possible heat up time, said machine, e.g. coffee machine, including an unit for controlling transmission of power to a thermal conditioning device, such a heater or cooler, said unit comprising:
- a controller with a start-up profile for starting-up such a thermal conditioning device from a temperature of inactivity to an operative temperature for bringing to a target temperature a fluid circulating through said thermal conditioning device at start-up end; and
- a temperature sensor connected or included to said controller for determining a temperature of said fluid upon circulation through said thermal conditioning device, where said controller includes at least a clock to launch measures of temperature at periodic time intervals, and includes data storage means for storing a target temperature and for storing temperatures measured at said periodic time intervals, and said controller further including calculation means for calculating a switch-off temperature, characterized in that:
a) said clock triggers at each time interval a measure of temperature;
b) said measured temperatures are stored one after another in a stack memory included in said data storage means;
c) said calculation means calculate temperature gradients between some of said stored temperatures values;
d) said calculation means calculate an average gradient of said temperature gradients;
e) said calculation means calculate a switch-off temperature by subtracting an overshoot temperature to said target temperature, said overshoot temperature corresponding to said average gradient by means of a calculation from said last calculated average gradient, or by means of a correlation with store conversion tables between said average gradients and overshoot temperatures, f) said controller device switches off said thermal conditioning device when the last measured temperature overshoots said calculated switch-off temperature.

Other exemplary features of the invention are disclosed in the following description.

A system index can be defined during each heat up that fulfils certain criteria. This index is written to a permanent memory, e.g. an EEPROM. Repeated heat up cycles allow the system to adapt to the actual operating constraints.

The heat up algorithm typically depends on the system index and allows an accurate forecast of the needed heat energy to bring the heating system to target temperature in the shortest possible time.

The pre-heating and the start-up are adapted to the machine itself and to its particular environment of use. The controller controls the thermal answer of the thermal conditioning device, particularly of the heating device, before powering. In particular, the controller processes temperature measures of the thermal conditioning and controls the temperature conditioning accordingly. The invention thus allows an adaptive, self-learning, control of heating with the shortest possible heat up time.

BRIEF DESCRIPTION OF THE DRAWINGS

The invention will now be described with reference to the schematic drawings, wherein.

DETAILED DESCRIPTION

The following description of exemplary embodiments according to the invention related to electrical devices for the preparation of beverages.

Figure 1:
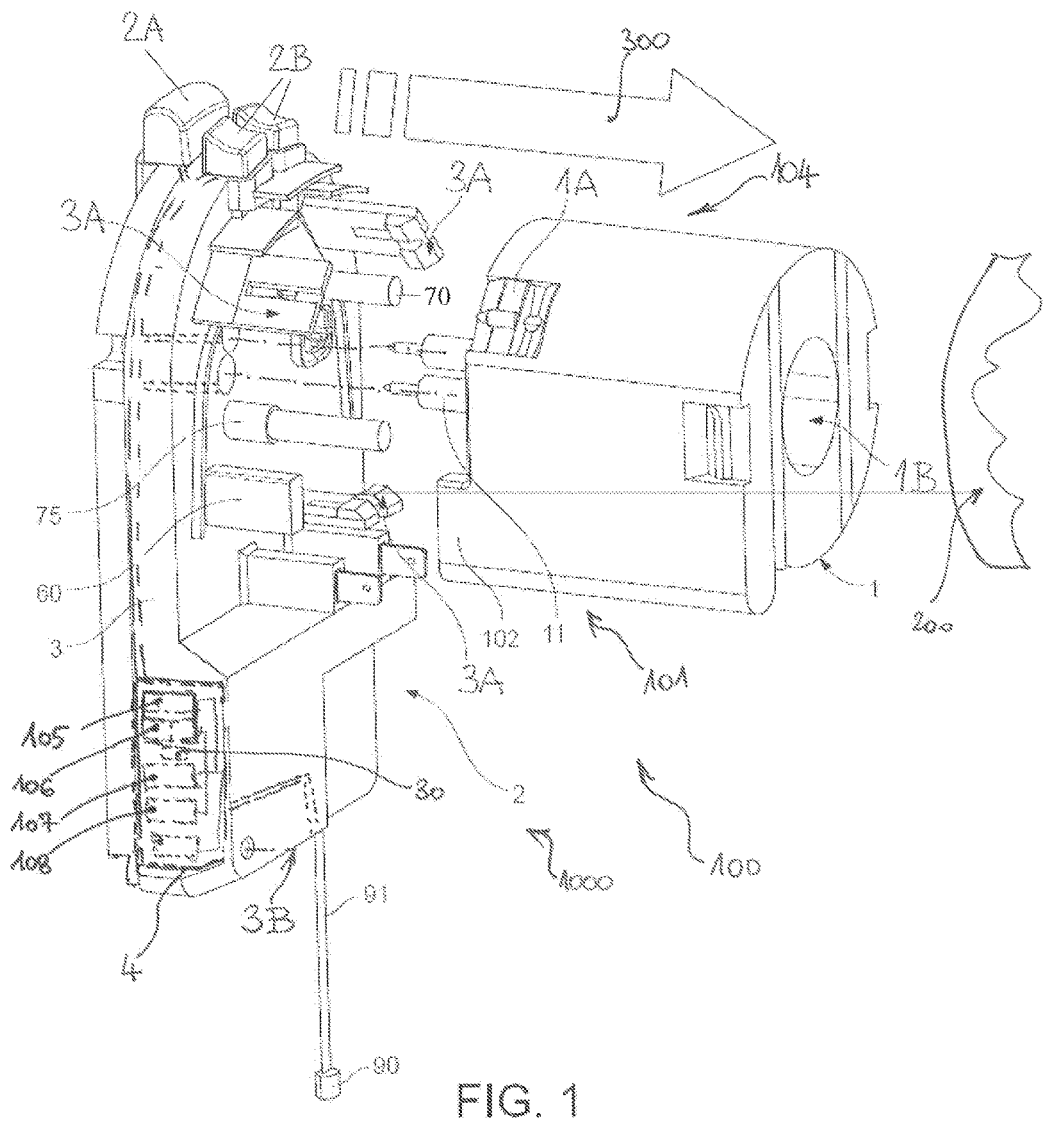
FIG. 1 shows a heating device according to the invention incorporating a thermoblock with a self-learning controller.

FIG. 1 shows a unit 1000 for controlling transmission of power to a thermal conditioning device 100, such a heater or cooler, said unit 1000 comprising:

a controller 2 with a start-up profile for starting-up such a thermal conditioning device 100 from a temperature of inactivity TI to an operative temperature for bringing to a target temperature TT a fluid circulating through said thermal conditioning device 100 at start-up end; and a temperature sensor 70 connected to said controller 2 for determining a temperature of said fluid upon circulation through said thermal conditioning device 100.

This controller 2 is arranged to allow circulation of fluid through this thermal conditioning device 100 at start-up end and to compare the determined temperature SOT of fluid circulated at start-up end to the target temperature TT and derive a temperature difference therefrom.

According the invention, the start-up profile has at least one parameter, and this controller 2 has a self-learning mode for adjusting this at least one parameter as a function of this temperature difference and to store the adjusted parameter or parameters for a subsequent starting-up of this thermal device 100.

According the invention, this parameter of the start-up profile can be, preferably but not restrictively:
a duration of the power start-up profile;
a power intensity of the power start-up profile;
a target temperature TT of said thermal conditioning device 100.

A detailed example of such a start-up profile will be presented further in the description of the invention.

This thermal conditioning device 100 may have a thermal accumulator or a thermoblock.

Hereafter is described a preferred realisation for a thermal conditioning device 100, such a heater or cooler, for a beverage preparation machine, particularly a coffee machine 104.

FIG. 1 shows an exploded view of a thermal conditioning device 100, also said heater, of a beverage preparation machine only partially shown on the figures, particularly a coffee machine 104 only partially shown on the figures, in which liquid is circulated through a thermoblock 101 and then guided into a brewing chamber 200 for brewing a beverage ingredient supplied into the brewing chamber 200. An example of such a beverage machine is disclosed in WO 2009/130099, the content of which is hereby incorporated by way of reference.

For instance, a beverage ingredient is supplied to the beverage preparation machine, particularly the coffee machine 104, in a capsule. Typically, this type of beverage machine is suitable to prepare coffee and is in this case called a coffee machine 104, or to prepare tea and/or other hot beverages or even soups and like food preparations. The pressure of the liquid circulated to the brewing chamber 200 may for instance reach about 2 to 25 bar, in particular 5 to 20 bar such as 10 to 15 bar.

The thermal conditioning device 100 shown in FIG. 1 has a thermoblock 101 with an aluminium metal mass 1 and a controller 2 like a functional block including a thermal and electrically insulating plastic housing 3 containing a printed circuit board 4, e.g. bearing one or more controllers, memory devices, and similar, which are detailed hereafter. According to the invention, said controller 2 is a self-learning controller.

Metal mass 1 incorporates a water inlet, a water outlet and a water heating duct extending there between to form a free-flow passage not shown on the figures for guiding water circulating from a water reservoir via a pump not shown on the figures through metal mass 1.

Figure 2:
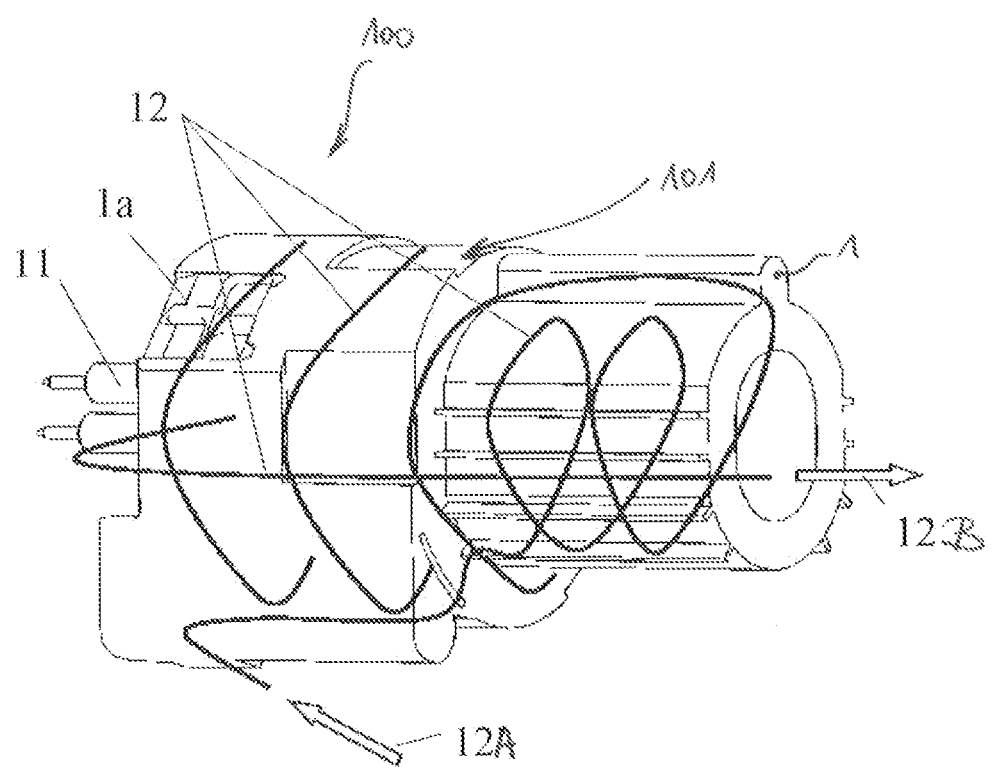
FIG. 2 illustrates a fluid circulation in a similar thermoblock.

As illustrated in FIG. 2 a thermoblock's mass 1 may include a heating duct 12. Heating duct 12 has an inlet 12A and an outlet 12B.

Heating duct 12 may extend helicoidally through mass 1 and in particular along a generally horizontal axis. Duct 12 may have upper flow portions followed by a down-coming flow portions. Such upper flow and down-coming flow portions of duct 12 may have a narrowed cross-section for promoting an increased velocity of water therealong to inhibit an accumulation of bubbles in such upper flow portion by pushing them down the down-coming flow portion by the flow of water with increased velocity. In this configuration, the duct is arranged so that the size of its cross-section changes along the chamber, to increase the flow velocity in areas, usually upper areas, which might otherwise serve to capture bubbles, in particular vapor bubbles. The increased liquid velocity in these areas "washes" all possible bubbles away from these areas with the fast flow of liquid in these areas. To avoid overheating in such areas with reduced cross-section, the heating power may be reduced on the corresponding parts of the heater, for instance, by adjusting the resistive means on these parts. In a variation, this duct has a reduced cross-section along its entire length to provide a sufficient velocity of the water flow for flushing possible vapour bubbles formed therein during heating. The heating duct 12 may be provided with different sections to influence the flow so that the thermal transfer is more evenly distributed and prevents local overheating and resulting bubble formation.

As illustrated in FIG. 1, metal mass 1 of the thermoblock 101 further includes an opening 1B which forms or rigidly anchors an upstream part of the brewing chamber 200 only partially shown on the figures so that the rigid passage of metal mass 1 extends into the brewing chamber 200. The beverage preparation machine or coffee machine 104 also comprises a downstream part not shown on the figures having a beverage outlet and cooperating with the upstream part to form the brewing chamber 200, the downstream part and the upstream part can be arranged to be moved apart and moved together for the supply into the brewing chamber 200 and the evacuation from the brewing chamber 200 of the ingredient.

Typically, the upstream part of the brewing chamber 200 that is integrated into the thermoblock 101, will be fixed in the beverage preparation machine or coffee machine 104 and the downstream part of the brewing chamber will be movable, or vice versa. The brewing chamber 200 may have a generally horizontal orientation, i.e. such a configuration and orientation that the water flows through the in the brewing chamber 200 along a generally horizontal direction, and the upstream part and/or downstream part may be movable in the same or in the opposite direction of the water flow in the chamber. Embodiments of such a thermoblock and brewing chamber are for example disclosed in WO 2009/043630, the content of which is hereby incorporated by way of reference.

Controller 2 is secured to metal mass 1 via snaps 3A of housing 3 that cooperate with corresponding recesses 1A in the surface of metal mass 1 when housing 3 is assembled to metal mass 1 in the direction of arrow 300.

The two part housing 3 of controller 2 encloses a printed circuit board 4 said PCB on all sides, in particular in a substantially impervious manner so as to protect the PCB 4 against liquid and vapours in the machine. This PCB 4 is shown on FIG. 1 by transparency. The two parts of housing 3 may be assembled by screws 3B or any other appropriate assembly means, such as rivets, gluing, welding, or the same. Controller 2 includes a user interface with a master switch 2A and two control switches 2B that are connected via housing 3 to the PCB. It is of course possible to use more elaborated user interfaces including screens or touch screens. The PCB 4 includes power connectors for supplying electric heating power to metal mass 1 via power pins 11 extending through corresponding openings in housing 3, further electrical connectors for one or more further electric devices of the beverage preparation machine, such as a user interface, pump, fan, valve, sensors, or the same, as required, and a connector to the mains for the central electric power supply.

The thermoblock 101 receives electric components, namely at least one temperature sensor 70 connected to the PCB 4, a thermal fuses 75, a power switch in the form of a triac 60 in a cavity the opening of which is formed between protruding walls 102 and a heating resistor not shown on the figures with connector pins 11, that are rigidly secured into metal mass 1 and rigidly connected to the PCB 4. Furthermore, the PCB 4 is electrically connected via a rigid connector or cable 91 to a hall sensor 90 of a flowmeter that is located on the water circuit of the beverage preparation machine, typically between a pump and a water or other liquid source such as a water or liquid reservoir, or between a pump and a thermal conditioning device 100, or within the thermal conditioning device 100.

Moreover, the PCB 4 may carry a micro-controller or processor and possibly a clock 30, preferably a quartz clock, for controlling the intensity of current passed to resistive heating element based on the flow rate of the circulating water measured with the flow meter and the temperature of the heated water measured with the temperature sensor 70. Sensor 70 may be located within the thermoblock at a distance from the circulating water so as to provide an indirect measure of the water temperature. To increase the accuracy of the temperature control, one or more temperature sensors 70 may be incorporated into metal mass 1 and/or into the brewing chamber 200 and/or upstream the metal mass 1 or at its water inlet. The controller or processor may also control further functions of the liquid food or beverage preparation machine, such as a pump, a liquid level detector in a water supply reservoir, a valve, a user interface, a power management arrangement, an automatic beverage ingredient supplier such as an integrated coffee grinder or an automatic supplier of ingredient capsules or pods, or the same.

Further details of the heating device and its integration in a beverage preparation machine are for example disclosed in WO2009/043630, WO 2009/043851, WO 2009/043865 and WO 2009/130099, the contents of which are hereby incorporated by way of reference.

Hereafter is presented a detailed example of a start-up profile of a controller 2, with a preferred associated method of control, in order to use the controller 2 as a self-learning controller, and in order to use the thermal conditioning device 100 as a self-learning thermal conditioning device.

This start-up profile and this method are arranged in order to optimize the heating up of such a thermal conditioning device 100 for a beverage preparation machine, particularly a coffee machine 104, in which liquid is circulated through a thermoblock 101 and then guided into a brewing chamber 200 for brewing a beverage ingredient supplied into the brewing chamber 200.

More particularly the invention concerns such a thermal conditioning device 100 including at least such a self-learning controller 2, arranged to be used as a self-learning thermal conditioning device and arranged to be incorporated into such a beverage preparation machine, e.g. a coffee machine 104, which can each include a plurality of such thermal conditioning devices 100, for example for different preparations.

This self-learning controller 2 comprises:
- at least one temperature sensor 70 connected or integrated to the controller 2; and
- at least one clock 30 to launch measures of temperature Ti at periodic time intervals ti.

Preferably it also includes:
- data storage means 105 for storing a target temperature TT, which is in the case of a coffee machine the actual operative temperature to make coffee, and said measured temperatures Ti ad said periodic time intervals ti; and
- calculation means 107 for calculating a switch-off temperature SOT.

According the invention these said calculation means 107 are arranged for:
a) calculating temperature gradients Gi between different stored temperatures Ti values;
b) calculating an average gradient AG of said temperature gradients Gi; and
c) calculating a switch-off temperature SOT by subtracting an overshoot temperature OS to said target temperature TT, said overshoot temperature OS corresponding to said average gradient AG by means of a calculation or a correlation. This overshoot depends on the thermic inertia of the installation.

The start-up profile of the controller 2 allows reaching the optimal operative temperature. In a preferred manner this operative temperature is equal to this switch-off temperature SOT.

According the invention said storage means 105 are further arranged for storing one or more of following parameters, and preferably all of them:
A) said calculated or correlated overshoot temperature OS;
B) said calculated temperature gradients Gi;
C) said calculated average gradient AG; and
D) said calculated switch-off temperature SOT.

Said self-learning controller device 2 is arranged for switching off said thermal conditioning device 100 when the last measured temperature Ti overshoots said calculated switch-off temperature SOT.

In an embodiment, said data storage means 105 store conversion tables 108 between said average gradients AG and overshoot temperatures OS, and in that the value of overshoot temperature OS corresponding to the last calculated average gradient AG is extracted from said conversion tables by said calculation means 107.

In another embodiment, said calculation means 107 calculate said value of overshoot temperature OS from said last calculated average gradient AG.

This self-learning controller 2 enables the working of a process method for optimized heating up of the thermal conditioning device 100, to operating temperature from any starting temperature or temperature of inactivity TI with best possible heat up time.

The method of optimized heating up of such a thermal conditioning device 100 for a beverage preparation machine, such as a coffee machine 104, to operating temperature from any starting temperature with best possible heat up time, includes the following steps:
a) said clock 30 triggers at each time interval a measure of temperature Ti;
b) said measured temperatures Ti are stored one after another in a stack memory 106 included in said data storage means 105;
c) said calculation means 107 calculate temperature gradients Gi between some of said stored temperatures Ti values;
d) said calculation means 107 calculate an average gradient AG of said temperature gradients Gi;
e) said calculation means 107 calculate a switch-off temperature SOT by subtracting an overshoot temperature OS to said target temperature TT, said overshoot temperature OS corresponding to said average gradient AG by means of a calculation or a correlation; and
f) said controller 2 device switches off said thermal conditioning device 100 when the last measured temperature overshoots said calculated switch-off temperature SOT.

Preferably said storage means 105 still store:
said calculated or correlated overshoot temperature OS;
said calculated temperature gradients Gi; and
and said calculated average gradient AG, and said calculated switch-off temperature SOT.

Said data storage means 105 may include a stack memory 106 for storing a given number N of successive measured temperatures Ti corresponding to a given duration D, each new measured temperature Ti controlled by said clock 30 being stored in said stack memory 106 while the oldest measured temperature being eliminated from said stack memory 106.

In an embodiment, said calculation means 107 calculate each temperature gradient Gi between stored measured temperatures Ti which are spaced from each other of half of said given duration D, each new calculated temperature gradient Gi being stored in said stack memory 106 while the oldest calculated gradient being eliminated from said stack memory 106.

Said given number N of successive measured temperatures Ti stored may be an even number, and the number of stored temperature gradients Gi can be equal to half of said even number N.

In the following and not limitative example this given number N is set to 8, the period of time, i.e. time interval, between two following temperature measures is 0.5 sec, and the supervision of heat-up of the heater is a duration D of 4 gliding seconds. The number n of calculated temperature gradients is 4.

In order to determine the value of the overshoot temperature OS two ways are possible:
either said data storage means 105 store conversion tables 108 between said average gradients AG and overshoot temperatures OT, and the value of overshoot temperature OT corresponding to the last calculated average gradient AG is extracted from said conversion tables 108 by said calculation means 107,
or said calculation means 107 calculate said value of overshoot temperature OT from said last calculated average gradient AG.

In an embodiment, said controller 2 implements a software, preferably dedicated to the thermal conditioning device 100 concerned, said software managing the heat up cycle of a thermal conditioning device 100 of the coffee machine 104 or similar, said software is using a system index that is written and stored to a permanent memory, e.g. EEPROM.

Preferably the PCB 4 contains said data storage means 105, said stack memory 106, said calculation means 107, said conversion tables 108, and said software.

Upon factory delivery this index is set to average environmental and technical constellations.

With each heat up this index is re-calculated and if it fulfils certain criteria it is written to the permanent memory. That means the old index is overwritten by the new index.

Such criteria that need to be fulfilled to overwrite the old index include:
how constant is the gradient of the temperature rise, e.g. less than 5% fluctuation over 5 sec.
temperature at the start of the heat up must be below a certain value, e.g. below 30 or 40° C.

The environment and certain technical constellations influence the time needed to heat up the coffee machine. Such constellations include:
net voltage tolerances, for example tolerances from nominal voltage up to +/−20%
heat resistance tolerances of heater element in thermoblock, for example +/−10% different environmental temperatures, for example 5° C. to 40° C.

different thermal isolation of heater, which entails different temperature losses, for example +/−5% different heater starting temperatures, for example 5° C. to 90° C.

heater either full of water or empty.

The system index is characterizing the gradient of the temperature rise during the heat up of the coffee machine 104. This index is depending on the following system parameters, linked to the environmental/technical constellations described above:

effective net voltage effective heat resistance effective temperature sensor characteristic current environmental temperature effective energy loss of heater, particularly energy fluctuation due to isolation, position in machine current heater starting temperature, from 5° C. to 90° C.

heater filled with water or empty.

As the index is re-calculated with each new heat up, it is changing. Originally, according to a factory setting, the index is set to an "average environment". With the repeated recalculation according the invention the index is adjusted to the actual environment the machine is operated in and the technical characteristics of the components built into the specific machine the index is calculated for. The constant re-calculation of the index allows also the adaption to changing conditions, e.g. seasonal changes, location changes, or similar.

As the index is optimized to its environment it allows in the software of the coffee machine 104 the definition of the needed energy, during the time the heater is switched on, to drive the heater to the target temperature TT with one single and well defined pulse in the best possible heat up time. It allows obtaining physically absolute best case for the heat up time.

The machine takes the last stored index number from the EEPROM and calculates the needed time the heater is switched on to reach the target temperature based on the index from the permanent memory.

The starting point for the first coffee brewing can be defined in three possible ways:

in a first way, heat up the system with one energy shot from any starting temperature, and wait with the release of the brewing mode until the temperature sensor reaches target brewing temperature. Indicate brewing mode ready with any signal for the user, typically done with a LED signal or the same.

in a second way, heat up the system with one energy shot from any starting temperature, and release the brewing mode as soon as this energy shot is done. The energy is already in the system, but the temperature sensor, due to thermal inertia, has still not reached target temperature. The correction for this thermal inertia delay will be made by using a different temperature regulation for the first cup after heating. This different regulation of the first cup brewing depends to the time delay between this shot energy batch is finished and the first cup is started by the user. Typically this delay varies between 0 sec. and approximately 15 sec., after 15 sec. the thermal inertia of the system is balanced and the system is equal to status one and ready for standard brewing.

in a third way heat up the system with one energy shot from any starting temperature, the user presses a coffee button during one shot heat up, and the pump will start as soon as this energy shot is done. Therefore the first cup regulation is as written in the second way with a delay of 0 sec.

The brewing mode, or more generally the beverage preparation mode, includes the circulation of fluid, e.g. water, through the thermal device, e.g. heater, once the thermal conditioning device is thermally ready for bringing to the target temperature the fluid circulating therethrough for preparing a beverage, e.g. coffee, with the desired properties, e.g. temperature and/or brewing characteristics.

Figure 3:
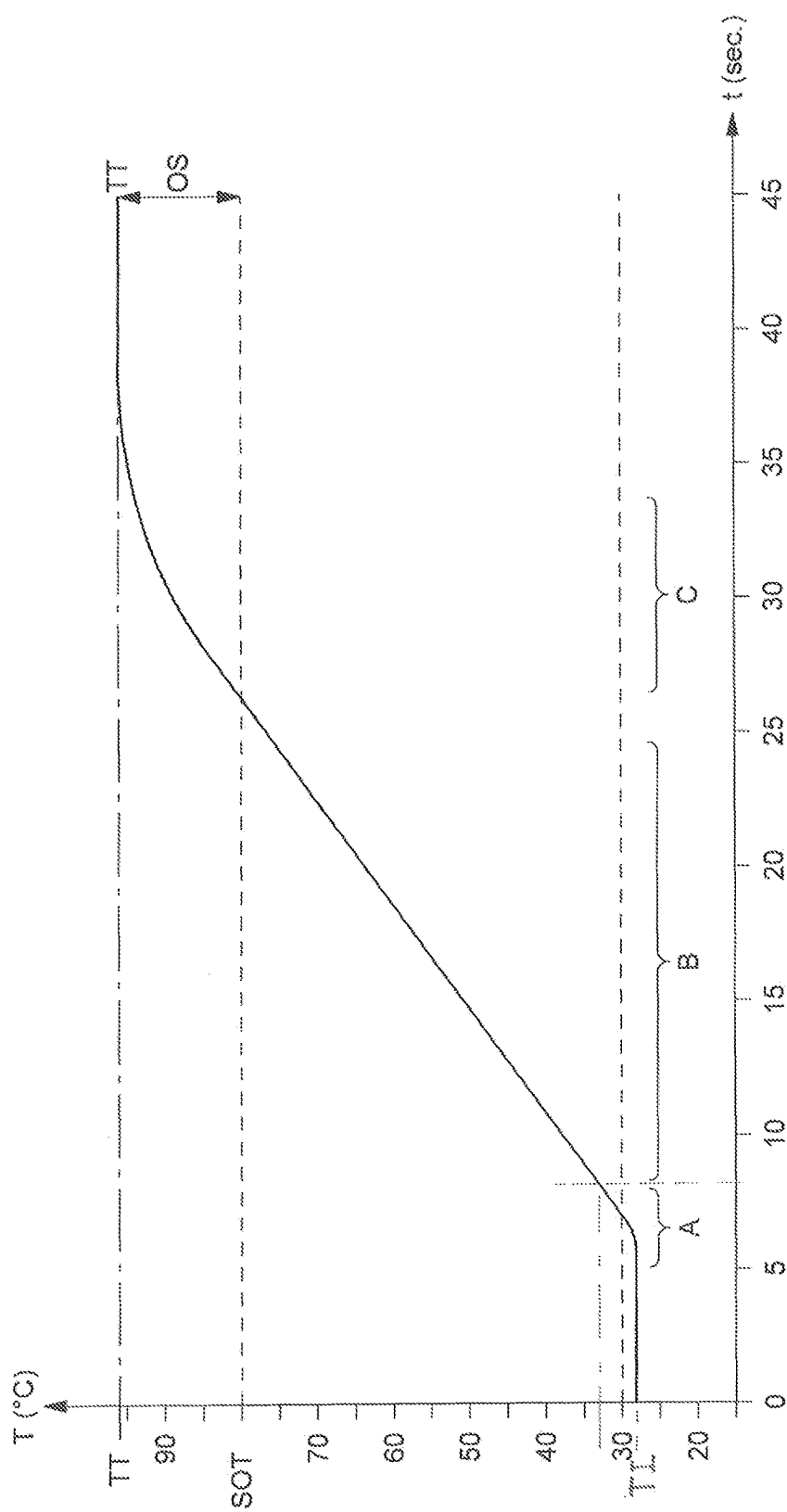
FIG. 3 shows a temperature/time diagram according to the invention.

In detail of FIG. 3, the heat-up curve can be classified in three typical areas: a first area A "heat-up start", a second area B "linear temperature gradient" and a third area C "heat-up engage".

In the first area A "start heat-up" the change of temperature gradient is very extreme. This first area is not useable for calculating a constant gradient of temperature.

The second area B "linear temperature gradient" is the important area to calculate the temperature gradient.

After switching off the heater, the third area C "engage area" begins. Here engages the temperature from the temperature SOT switch off temperature, where the heater is switched off to the target temperature TT. This target temperature TT can be a parameter of the machine, for example with the maximal value of 96° C. for a coffee machine: in a variant the user can set it, for example with a button or the same.

The gradient of temperature can be calculated from heat up start until the end of the "linear temperature gradient" sequence. After leaving this temperature area, the gradient of temperature is frozen to the last calculated value. For example, the last 4 seconds of gradient calculation are considered and stored to the machine EEPROM.

In the fast heat-up mode the temperatures of the thermoblock are stored in an array of N samples in discrete time steps of D/N sec., e.g. 8 samples in discrete time steps of 0.5 sec. In this array the average of the last D, e.g. 4, measured seconds is always available.

After every periodic step of D/N sec, e.g. 0.5 sec., the oldest temperature is deleted, which corresponds to the temperature at a time of D, e.g. 4 sec., before the present instant, and a new temperature is stored. Thereafter, the calculating process may start again.

In fast heat-up mode, for every time step of D/N, e.g. 0.5 sec., a temperature gradient is calculated from these values.

The algorithm of acquiring the temperature gradient can be the following in the case of N=8:

Temperature values T1 to TN can be stored in an array as here described, assuming a later temperature is higher than the previous temperature. At a given point of time (t=0), the array will contain the following previous acquired (e.g. measured and/or derived) and stored temperature values:

T1=temperature (t=−0.5 sec)

T2=temperature (t=−1 sec),

T3=temperature (t=−1.5 sec),

T4=temperature (t=−2 sec),

T5=temperature (t=−2.5 sec),

T6=temperature (t=−3 sec),

T7=temperature (t=−3.5 sec),

T8=temperature (t=−4 sec),

From these values the average temperature gradient AG can be calculated as follows, after the calculation of the n temperature gradients $G_i$, from $G_1$ to $G_n$, e.g. n=N/2=4

G1=Gradient 1=T1-T5=temperature (t=−0.5 sec)−temperature (t=−2.5 sec);

G2=Gradient 2=T2-T6=temperature (t=−1 sec)−temperature (t=−3 sec);

G3=Gradient 3=T3-T7=temperature (t=−1.5 sec)−temperature (t=−3.5 sec);
G4=Gradient 4=T4-T8=temperature (t=−2 sec)−temperature (t=−4 sec). Consecutively an average temperature gradient AG is built by averaging the 4 gradients mathematically: AG=1/n. $\Sigma_{i=1}^{n}$ with n=N/2 In this example, AG=¼(G1+G2+G3+G4).

A definition of the overshoot temperature OS after switching the heater off may be the following: the overshoot temperature OS of a thermoblock system depends on all relevant physical influences like gradient of heating temperature course, mass of the thermoblock, mass of the filling, namely with water, in the thermoblock and can be calculated or determined experimentally.

The average gradient of temperature AG can now be allocated to one specific overshoot OS temperature.
The switch off heater temperature SOT of the heater is calculated or determined by using a conversion table 108 for example as following:

| AG = Gradient (° C./sec) | 7 | 8 | 9 | 10 | 11 | 12 |
|---|---|---|---|---|---|---|
| OS = Overshoot (° C.) | 8 | 10 | 11 | 12 | 13 | 13 |

SOT=Switch off heater temperature=TT−OS
SOT=Target temperature heatup−Overshoot temperature
AG=1/n. $\Sigma_{i=1}^{N} G_i$ n=N/2

A cold heat up can be defined as a heat up process that starts with a heater temperature below a threshold temperature, e.g. 50° C. During such a heat up the above mentioned determination of the temperature gradient is possible and each time done. In this case, the machine works already in the current heat up with the simultaneously elaborated gradient.

A warm heat up occurs as soon as the machine has to be heated up when the heater is already above this threshold temperature, e.g. 50° C. Then the system is not able to determine the temperature gradient and thus the last stored number in the EEPROM will be considered for defining the overshoot temperature.

The improvements and advantages achieved by the invention include a self calibrating system to optimize heat up time, working with optimal heat up time from every heater starting temperature, any heater power tolerance, network voltage tolerance, water in thermoblock, heater energy loss and environmental temperature.

Additionally, the first cup of beverage can be prepared after a cold start up in three possible modes:
A) based on the temperature measured, after one single energy shot is sent through the heating device and the thermal inertia of the system is balanced
B) based on the calculated energy batch of one single energy shot and the delay between end of heating up and starting first cup
C) on request by a user, while the heat up algorithm of one single energy shot is carried out, the beverage preparation being carried out without delay automatically thereafter.

The selection of these modes A, B, C, can be made by the user with a selection button or by the controller itself.

Figure 4:
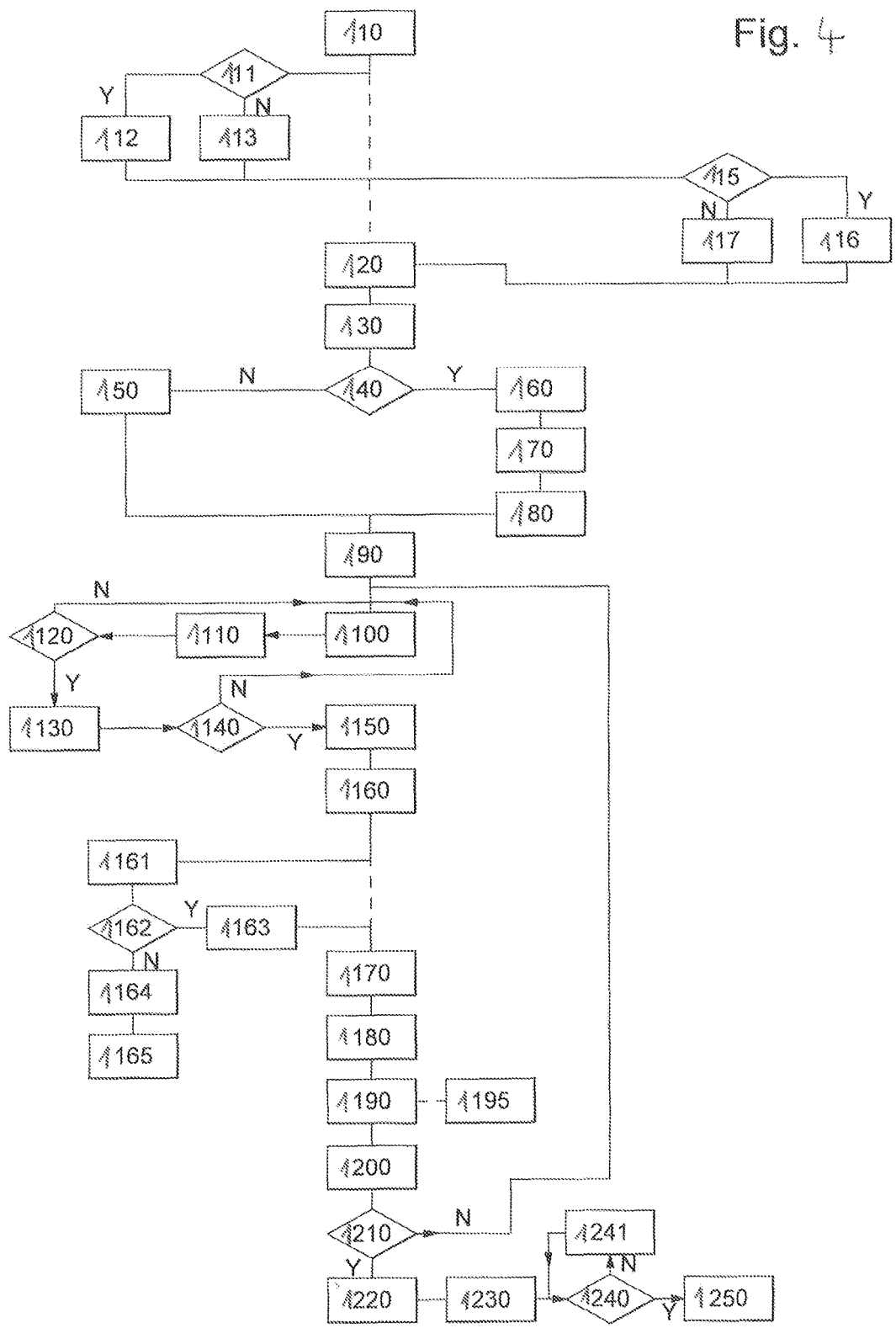
FIG. 4 shows a logic diagram of a process according to the invention.

The logic diagram of FIG. 4 shows an example of the sequence of steps to build a software for the control of heating up according to the invention:
step 110: power on
optional variant step 11: choose target temperature TT?
If yes, step 12 input value of TT
If no, step 13 call memory, and validate the last TT
optional variant step 115: choose mode A,B,C?
If yes, step 116 select chosen mode
If no, step 117 call memory, and validate the last mode
step 120: reset time counter to zero and start the clock
step 130: measure heater temperature HT
step 140: HT greater as 50° C.?
If no, step 150
If yes, step 160
step 150: determination of temperature gradient G at each time and current heat up
step 160: system not able to determine the temperature gradient
step 170: read last stored number of average gradient AG in the EEPROM
step 180: take it as overshoot temperature OS
step 190: start heat up
step 1100: heat up
step 1110: measure time
step 1120: +D/N sec. ?
If no, return to step 1100
If yes, step 1130
step 1130: store last value of current temperature CT
step 1140: number of values=N?
If no, return to step 1100
If yes, step 1150
step 150: store temperature value
step 160: delete Nth oldest value
variant step 1161: calculation of difference between (last value of current temperature LVCT)−(penultimate value of current temperature PVCT)
Step 1162: LVCT−PVCT greater as zero?
If yes, step 1163 continue, go to step 1170
If no, step 1164 alarm, and step 1165 power off
step 1170: calculation of temperature gradients $G_i$
step 1180: calculation of average gradient AG
step 1190: determination of overshoot OS
Variant instead step 1190: step 1195 calculation of overshoot OS
step 1200: calculation of the switch-off temperature SOT=TT−OS
step 1210: current temperature CT greater as SOT?
If no return to step 1100
If yes, step 1220 switch off heater
step 1230: store last average gradient AG
step 1240: current temperature=TT?
If no, step 1241 wait, and return step 1240
If yes, step 1250 ready to prepare beverage to user.

This logic diagram is an example. It will be apparent to the skilled person that other sequences allow the realization of the invention.

An advantage of the invention lies in a very fast heat up time, combined with an immediate release of the brewing mode, which saves time, and the possibility of a semi-automatic start of first cup brewing. This heating device is a self-learning heating device and its utilisation is very easy for the user.

The invention claimed is:
1. A unit for controlling transmission of power to a thermal conditioning device, the unit comprising:
a controller with a start-up profile for starting-up such a thermal conditioning device from a temperature of inactivity to an operative temperature for bringing to a preheating target temperature a fluid circulating through the thermal conditioning device at start-up end;

a temperature sensor connected to the controller for determining a temperature of the fluid upon circulation through the thermal conditioning device;

the controller being arranged to allow circulation of fluid through the thermal conditioning device at the end of start-up and to compare the determined temperature of fluid circulated at the end of start-up to the preheating target temperature and derive a temperature difference therefrom, the controller including (1) at least a clock to launch measures of temperature at periodic time intervals, (2) data storage for storing the preheating target temperature and for storing temperatures measured at the periodic time intervals, and (3) a calculator that calculates a switch-off temperature, temperature gradients between different stored temperatures values, an average gradient of the temperature gradients, and a switch-off temperature by subtracting an overshoot temperature from the preheating target temperature, the overshoot temperature corresponding to the average gradient by calculation from the last calculated average gradient, or by a correlation with stored conversion tables between the average gradients and overshoot temperatures, wherein the data storage stores the overshoot temperature, the calculated temperature gradients, the calculated average gradient, and the calculated switch-off temperature, and wherein the controller is arranged for switching off the thermal conditioning device when the last measured temperature overshoots the calculated switch-off temperature; and the start-up profile has at least one parameter and the controller has a self-learning mode for adjusting the at least one parameter as a function of the temperature difference and to store the adjusted parameter for a subsequent starting-up of the thermal device.

2. The unit of claim 1, wherein the parameter is a duration of the power start-up profile.

3. The unit of claim 1, wherein the parameter is a power intensity of the power start-up profile.

4. The unit of claim 1, wherein the parameter is the preheating target temperature of the thermal conditioning device.

5. The unit of claim 1, wherein the thermal conditioning device has a thermal accumulator or a thermoblock.

6. The unit of claim 1, wherein the data storage includes a stack memory for storing a given number of successive measured temperatures corresponding to a given duration, and each new measured temperature controlled by the clock being stored in the stack memory while the oldest measured temperature is eliminated from the stack memory, and wherein the calculator calculates each temperature gradient between stored measured temperatures which are spaced from each by half of the given duration, each new calculated temperature gradient being stored in the stack memory while the oldest calculated temperature gradient being eliminated from the stack memory.

* * * * *